United States Patent [11] 3,630,044

| [72] | Inventor | Don P. Dixon<br>4926 Space Center Drive, San Antonio, Tex. 78218 |
|---|---|---|
| [21] | Appl. No. | 50,368 |
| [22] | Filed | June 29, 1970 |
| [45] | Patented | Dec. 28, 1971 |

[54] AUTOMOBILE AIR CONDITIONING SYSTEM
2 Claims, 5 Drawing Figs.

| [52] | U.S. Cl. | 62/243,<br>62/241, 62/244, 62/507 |
|---|---|---|
| [51] | Int. Cl. | B60h 3/04 |
| [50] | Field of Search | 62/243,<br>244, 241 |

[56] References Cited
UNITED STATES PATENTS
3,381,493  5/1971  Dixon..........................  62/244

*Primary Examiner*—William J. Wye
*Attorney*—Hyer, Eickenroht, Thompson & Turner ABSTRACT: An air conditioning system for a "fast back" or "square back" Volkswagen automobile including a condenser assembly supported behind the spare tire compartment by means of brackets which are connected to the rear wall of the compartment.

Don P. Dixon
INVENTOR

BY Hyer, Eickenroht,
Thompson & Turner

ATTORNEYS

Don P. Dixon
INVENTOR

BY Hyer, Eickenroht,
Thompson & Turner

ATTORNEYS

AUTOMOBILE AIR CONDITIONING SYSTEM

This invention relates to an air conditioning system for an automobile; and, more particularly, an improved system which is especially well suited for the "bug"-type Volkswagen automobile.

Conventional air conditioning systems are not suited to the compact construction of the Volkswagen automobile. That is, there is a very basic problem in finding room for the components of the system, at least without a major modification of the construction of the Volkswagen and/or the use of specially designed parts. With this in mind, it has been proposed to locate the condenser assembly of the air conditioning system at the front end of the automobile, and particularly adjacent the undercarriage in a position to be cooled by outside air.

The design and installation of the assembly in this general area is not without its problems, both from the standpoint of limited space and inaccessibility of the area. My prior U.S. Pat. No. 3,381,492 shows an air conditioning system for an automobile of this type having a condenser assembly which is nevertheless relatively easy to install, with only a few modifications to the existing structure of the automobile.

An object of this invention is to provide a system in which the condenser assembly has these and other virtues.

A more particular object is to provide such an assembly which is supported from only one portion of the automobile, thereby further simplifying its construction and installation.

In the drawings, wherein like reference characters are used throughout to designate like parts:

Figure 1:
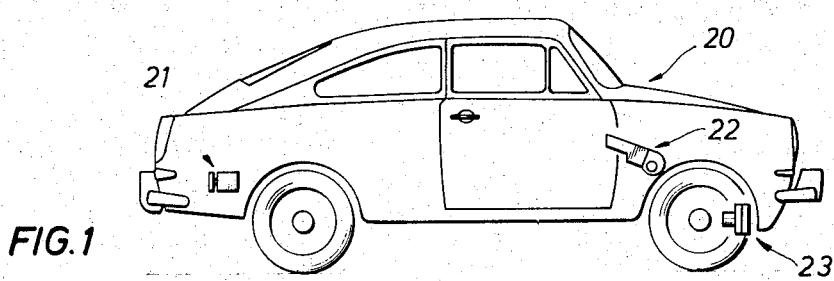
FIG. 1 is a side view of a fast back or square back-type Volkswagen automobile, with the condenser assembly, the evaporator, and the compressor of the air conditioning system superimposed thereon.

With reference now to the above-described drawings, and particularly FIG. 1, the Volkswagen automobile shown therein, and designated in its entirety by reference character 20, has its motor mounted in a compartment at the rear. Compressor 21 of the air conditioning system is shown in FIG. 1 in approximately the position it occupies within the motor compartment. As also indicated in FIG. 1, the evaporator 22 of the system is mounted within the passenger compartment beneath the dashboard, and the condenser assembly 23 is mounted in the forward portion of the automobile, as will be described in more detail to follow.

As well known in the art, these as well as other components of the air conditioning system are fluidly connected to one another for circulating a refrigerant therethrough and thereby cooling the interior of the automobile through outlets from the evaporator into the passenger compartment. Of course, power is transmitted from the crankshaft of the motor to the compressor 21, all in a manner to be described hereinafter.

Figure 2:
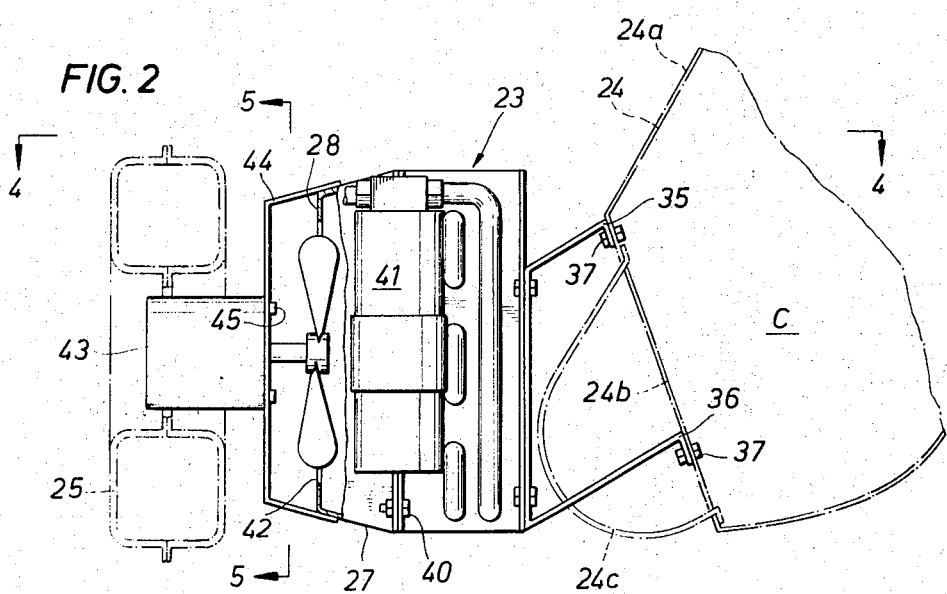
FIG. 2 is an enlarged vertical sectional view of the condenser assembly, with portions of the automobile shown in broken lines.

As shown by the broken lines in FIG. 2, the spare tire compartment C in the front end of the automobile has a rear wall 24 which is spaced forwardly of beam axle 25. More particularly, the wall 24 includes an upwardly and forwardly extending section 24A, a lower downwardly and forwardly extending section 24B, and a well 24C which protrudes rearwardly from the laterally midportion of the lower wall section to receive the lower portion of a spare tire in the compartment C. As also illustrated in FIG. 2, the outer edges of the well are bolted to the front side of the rear wall section 24B to permit the well to be moved into the compartment C upon release of the bolts.

Figure 4:
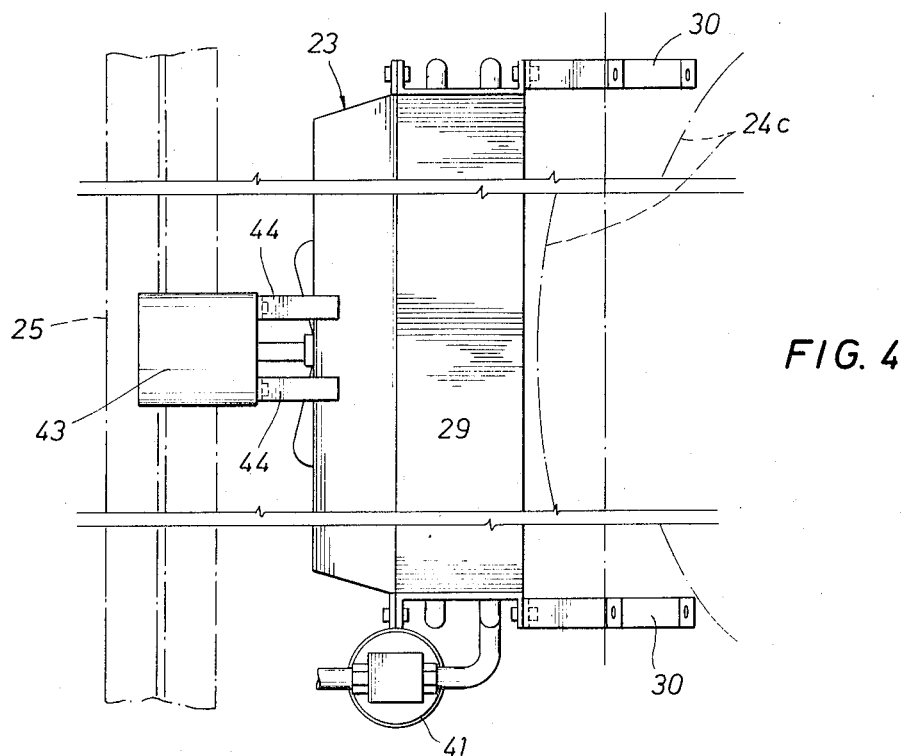
FIG. 4 is a top plan view of the assembly, as seen along broken line 4—4 of FIG. 2.
Figure 5:
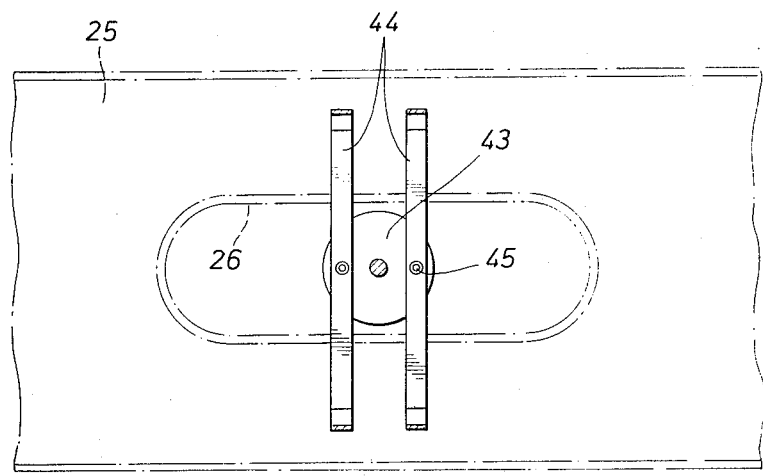
FIG. 5 is another vertical sectional view of a portion of the condenser assembly, as seen along broken line 5—5 of FIG. 2.

As shown in FIGS. 2 and 4, the axle beam 25 has a central opening 26 which extends through the beam from front to back and is disposed behind the well 24C. More particularly, the opening 26 is defined by the inner ends of welded flanges about front and rear halves of the beam.

The condenser chamber 23 includes a shroud 27 having a rear wall 28 and open at the front, and a coil 29 mounted across the open front of the shroud. As will be described more fully hereinafter, the coil and thus the shroud and other parts of the condenser assembly 23, are supported from the rear wall 24 of the spare tire compartment C. When the shroud and coil are so supported, there is only small clearance between them and the axle beam 25 and rear wall of the spare tire compartment. As will be apparent from FIG. 2, the coil 29 is nevertheless in position for air to pass through it and into the open front of the shroud during forward movement of the automobile.

More particularly, the coil 29 is supported from the lower section 24B or the rear wall 24 by means of a pair of brackets 30. Thus, each bracket includes a base 31 secured to the coil 29, and a pair of upper and lower arms 32 and 33, respectively, extending forwardly from opposite ends of the base and secured at their free ends to the wall portion 24B. As shown, the upper and lower arms are of different lengths so as to support the coil and thus the shroud, in vertically upright positions despite the inclination of wall section 24B with respect to the vertical.

As shown, there is a flange 34 at each end of the front side of the coil 29, and the base 31 of each bracket is secured to this flange by bolts or the like. The free ends of the legs 32 and 33 of each bracket 30 are provided with feet 35 and 36, respectively, having holes therein to receive bolts 37 for securing them to the rear wall portion 24B on opposite sides and generally symmetrically of the well 24C.

Additional flanges 38 are provided on the opposite ends of the rear side of the coil and flanges 39 are provided at opposite ends of the open front of the shroud 27. When the coil 29 is disposed across the open front of the shroud, the flanges 38 and 39 are engaged with one another and holes therein are aligned for receiving connecting bolts 40 or the like (see FIG. 2 and 4).

Figure 3:
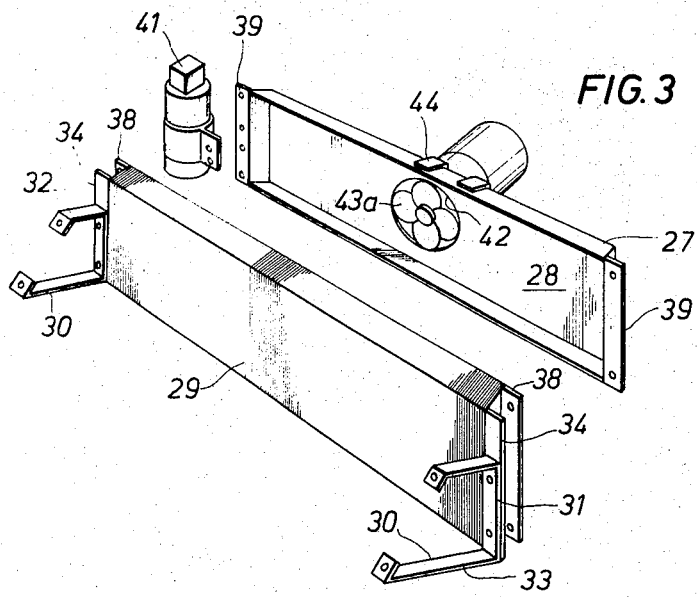
FIG. 3 is an exploded view of the parts of the condenser assembly.

A receiver-dryer 41 is mounted on the assembly by means of a flange extending from a bracket about the receiver-dryer and disposable intermediate flanges 38 and 39 on one end of the coil and shroud. Thus, as indicated in FIG. 3, holes in the flange are adapted to be aligned with holes in the flanges 38 and 39 so as to permit the receiver-dryer to be connected to the coil and shroud as the coil and shroud are connected to one another.

There is an opening 42 in the rear wall 28 of the shroud generally intermediate the opposite ends of the shroud, and thus in front of the opening 26 in the axle beam 25. A fan 43 is mounted for rotation within the shroud opening 42 by means of a motor 43 supported from the shroud and disposed within the axle beam opening 26.

Thus, the motor is connected to a pair of straps 44 which are welded to the shroud and extend vertically behind the rear wall 28 of the shroud. More particularly, each of the straps has a hole therethrough to receive studs 45 on the front of the motor for bolting the motor to the straps with the drive shaft of the motor for rotating the fan extending between the straps.

In preparation for installation of condenser assembly 23, holes are drilled in the rear wall section 24B of the spare tire compartment C to receive bolts 37. The brackets 30 are first secured to the flanges 34 of the coil 29, and coil, with the shroud 27, motor and fan supported thereon, are moved upwardly into the space behind the spare tire compartment. The well 24C is preferably released from the rear wall and moved into the compartment to provide greater space for moving the condenser assembly upwardly into the space behind the compartment, and particularly to facilitate movement of the motor 44 into the beam opening. When the assembly is so placed, holes in the feet 35 and 36 of the brackets 30 are aligned with the holes drilled in rear wall section 24B, and the bolts 37 are secured therethrough.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or as shown in accompanying drawings is to be interpreted as illustrative and not in a limiting sense.

The invention having been described, what is claimed is:

1. In a Volkswagen automobile having a spare tire compartment having a rear wall including a well to receive the lower end of the tire within the compartment, and an axle beam spaced behind the rear wall and having a central opening extending therethrough from front to back; an air conditioning system having a condenser assembly, comprising a coil, a shroud extending across the rear side of the coil, brackets supporting the coil and shroud from the rear wall of the spare tire compartment with the front side of the coil behind said well and the rear side of the shroud in front of the axle beam, said rear side of the shroud having an opening therein behind the coil, a fan rotatable within the opening, and a motor for the fan mounted on the shroud and extending into the central opening through said axle beam.

2. An air conditioning system of the character defined in claim 1, wherein each said bracket includes a base secured to the front side of the coil and upper and lower arms extending forwardly from the base to connection with said rear wall on opposite sides of said well.

\* \* \* \* \*